No. 668,581.　　　　　　　　　　　　　　　　Patented Feb. 19, 1901.
O. B. MARTIN.
TROLLEY WHEEL AND BEARING.
(Application filed July 30, 1900.)
(No Model.)
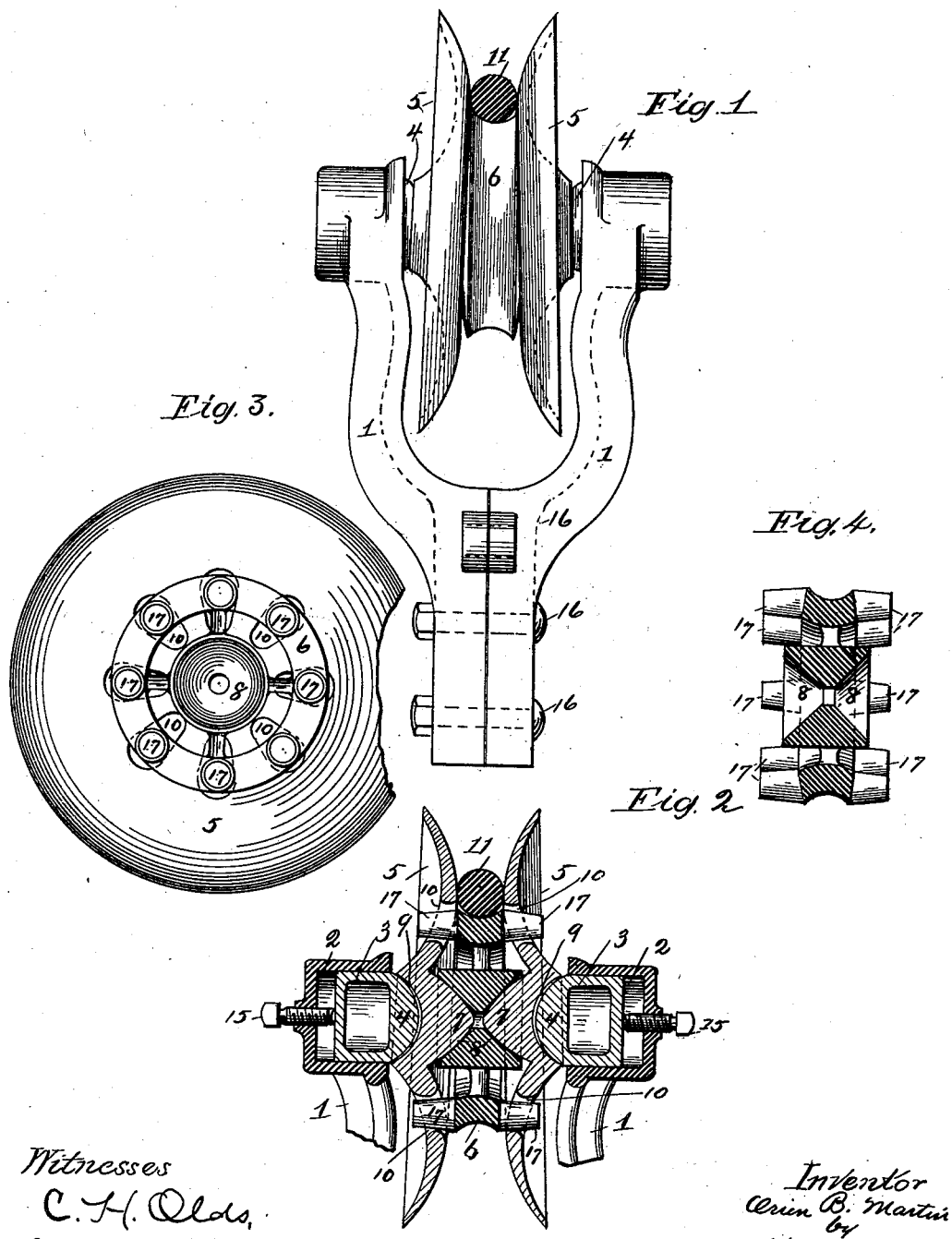

United States Patent Office.

ORIEN B. MARTIN, OF AKRON, OHIO.

TROLLEY-WHEEL AND BEARING.

SPECIFICATION forming part of Letters Patent No. 668,581, dated February 19, 1901.

Application filed July 30, 1900. Serial No. 25,236. (No model.)

*To all whom it may concern:*

Be it known that I, ORIEN B. MARTIN, a citizen of the United States, and a resident of Akron, county of Summit, State of Ohio, have invented certain new and useful Improvements in Trolley-Wheels and Bearings, of which I hereby declare the following to be a full, clear, and exact description, such as will enable others skilled in the art to which it appertains to make and use the same.

My invention relates to improvements in trolley-wheels and bearings therefor; and the objects of the invention are, primarily, to provide a trolley-wheel capable of clinging to or engaging the trolley-wire, and thereby increasing the area of contact therewith; secondly, to provide a flexible wheel which will open and pass over any unevenness or obstruction of the wire—such as switches, joints, &c.—without danger of being jolted from the wire by the shock caused by striking them; thirdly, to provide a removable pulley-tread or central portion which can be renewed at pleasure when worn out by use, and, finally, to provide a ventilated center with air circulation to keep the bearings cool and prevent frictional heat at great speeds.

My invention is exemplified in the accompanying drawings, as hereinafter described, and is more particularly pointed out in the claims.

In the accompanying drawings, Figure 1 is an edge view of my improved trolley-wheel. Fig. 2 is a central longitudinal section thereof and of the bearings. Fig. 3 is a front view of one of the flanges and the central pulley, and Fig. 4 is a central section through central pulley.

In the figures, 1 is the harp, in the cylindrical openings 2 in which are placed the short cylinders 3, which are provided with spherical extremities 4. The flanges 5 are separate pieces, supporting between them the central pulley 6 by means of conically-projecting bearings 7, which are inserted in conical depressions 8 in the sides of the pulley. The flanges are also provided with depressions 9 in their outer faces, into which are inserted the spherical extremities of the cylinders 4, thus supporting all the parts upon the harp 1.

In order to make the flanges and central pulley move in unison, one or more pins 17, integral with the pulley-disk, project on either side through openings 10 in the flanges. 11 is the wire, shown resting upon the pulley.

In action it will be seen that the central pulley when forced against the wire will drop slightly and the upper edges of the flanges will be drawn together, since the flanges will rotate on their spherical bearings and incline to meet the wire.

The inertia of the hanging pulley-center will normally tend to keep it down; but when going at a high rate of speed the center will rise to alinement with the harp-centers, thus greatly reducing the friction. Normally the pressure of the pole will depress the center, so as to engage the wire at the sides.

An adjusting-screw at 15 takes up the wear and determines the tension of the spherical bearings.

There are many advantages in the use of the device.

It will be seen that the construction is exceedingly simple, there is no central shaft, and the bearings can be taken up to accommodate wear.

Great economy is obtained in the use of the removable center, since the greatest weight of metal is found in the permanent runs, the central pulleys being comparatively small.

The harp is easily taken apart and fastened by bolts 16 and the old center removed and replaced by a new one, making practically a new wheel. The usual jolt experienced in passing over joints or switches wider than the wire is avoided, since the flanges separate and admit the obstruction to pass between them, and the wheel is not thrown down, as is usual with rigid flanges, which is often accountable for throwing the trolley off from the wire on curves and crossings.

I believe myself to be the first to invent a clinging or flexible trolley-wheel which will normally engage the wire closely, but will readily open to pass obstructions.

Having described my invention, what I claim as new, and desire to secure by Letters Patent, is—

1. In a trolley-wheel, individual flanges and a central independent depressible pulley-disk, in combination with a harp, and curved bearing-surfaces between the separate parts, substantially as described.

2. A flexible trolley-wheel, comprising the following component parts—a central pulley-disk, individual flanges, and curved bearings connecting the flanges with the disk and curved bearings connecting the flanges with the harp, combined as and for the purpose specified.

3. A flexible trolley-wheel, comprising individual pulley-disk and flanges, the said portions being connected by conical bearings and driving-pins upon the pulley-disk, in combination with a harp provided with spherical bearings, substantially as described.

4. In a trolley-wheel, the combination with a divided harp provided with spherical bearings, individual flanges provided with spherical recesses on their outer sides, and conical recesses on their inner sides, and a removable pulley-disk provided with conical projections, substantially as described.

5. In combination a depressible pulley-disk, individual flanges, a divided harp and flexible connections between the said parts whereby the tops of the flanges will approach one another when the pressure of the pole is applied to the wire, substantially as described.

6. In a flexible trolley, the combination with a depressible central pulley of individual flanges constructed and arranged to converge at the top as the pulley rotates, substantially as set forth.

7. In a trolley-wheel, the combination with a depressible central pulley, of individual flanges therefor, substantially as described.

In testimony whereof I have hereunto signed my name to this specification in the presence of two subscribing witnesses.

ORIEN B. MARTIN.

Witnesses:
WM. M. MONROE,
GEO. R. SMELTS.